United States Patent [19]

Ou-Yang

[11] Patent Number: 5,323,730

[45] Date of Patent: Jun. 28, 1994

[54] THERMALLY RESPONSIVE INDICATOR WITH ORGANIC RETAINING MEANS

[75] Inventor: David T. Ou-Yang, Woodbury, Minn.

[73] Assignee: Minnesota Mining and Manufacturing Company, St. Paul, Minn.

[21] Appl. No.: 20,100

[22] Filed: Feb. 19, 1993

Related U.S. Application Data

[63] Continuation of Ser. No. 747,385, Aug. 20, 1991, abandoned.

[51] Int. Cl.$^5$ .............................................. G01K 1/02
[52] U.S. Cl. .................................................... 116/218
[58] Field of Search ................ 116/207, 216, 217, 218; 374/106, 155, 160

[56] References Cited

U.S. PATENT DOCUMENTS

| D. 304,311 | 10/1989 | Radke ................................ D10/109 |
| 945,978 | 1/1910 | Nielsen et al. . |
| 1,441,307 | 1/1923 | Swanberg . |
| 1,509,110 | 9/1924 | Potter . |
| 3,090,235 | 5/1963 | Houser ............................ 374/155 X |
| 3,140,611 | 7/1964 | Kliewer ................................ 73/358 |
| 3,280,629 | 10/1966 | Kliewer ................................ 73/358 |
| 3,479,876 | 11/1969 | Kliewer ................................ 73/358 |
| 3,548,780 | 12/1970 | Kliewer ............................... 116/218 |
| 3,559,615 | 2/1971 | Kliewer ............................ 116/114.5 |
| 3,626,897 | 12/1971 | Kliewer ............................... 116/218 |
| 3,656,452 | 4/1972 | Kliewer ............................ 116/114.5 |
| 3,682,130 | 8/1972 | Jeffers ............................... 116/114.5 |
| 3,693,579 | 9/1972 | Kliewer ............................... 116/218 |
| 3,713,416 | 1/1973 | Volk ................................ 116/114.5 |
| 3,724,360 | 4/1973 | Kliewer et al. ........................ 99/342 |
| 3,759,103 | 9/1973 | Volk .................................... 73/358 |
| 3,811,402 | 5/1974 | Kelley et al. ..................... 116/114.5 |
| 3,820,499 | 6/1974 | Kliewer et al. .................... 116/114.5 |
| 3,834,226 | 9/1974 | Pecorella et al. ................. 116/217 X |
| 3,845,662 | 11/1974 | Surgina et al. .................. 116/217 X |
| 3,965,849 | 6/1976 | Gee .................................. 116/114.5 |
| 3,967,579 | 7/1976 | Seiter ............................... 116/207 X |
| 4,082,000 | 4/1978 | Volk .................................... 73/358 |
| 4,083,364 | 4/1978 | Kelly et al. .......................... 128/2 H |
| 4,170,956 | 10/1979 | Wear ................................... 116/218 |
| 4,289,088 | 9/1981 | Scibelli .............................. 116/218 |
| 4,421,053 | 12/1983 | Volk .................................. 116/218 |
| 4,638,340 | 1/1987 | Iiyama et al. .................... 427/152 X |
| 4,748,931 | 6/1988 | Volk .................................. 116/218 |
| 4,818,119 | 4/1989 | Busch et al. ........................ 374/208 |
| 4,826,762 | 5/1989 | Klibanov et al. ............... 116/217 X |
| 5,033,865 | 7/1991 | Kuze .................................. 374/160 |
| 5,061,677 | 10/1991 | Yoshida et al. .................. 427/152 X |
| 5,120,137 | 6/1992 | Ou-Yang ............................ 374/106 |
| 5,158,363 | 10/1992 | Speelman et al. ............. 374/106 X |

FOREIGN PATENT DOCUMENTS

| 2741358 | 3/1978 | Fed. Rep. of Germany ...... 116/217 |
| 3229020 | 2/1984 | Fed. Rep. of Germany . |
| 63214629 | 9/1988 | Japan ............................ G01K 11/06 |
| 1039531 | 2/1989 | Japan ............................ G01K 11/06 |

OTHER PUBLICATIONS

The Condensed Chemical Dictionary, Tenth Edition, 1981, pp. 774–775.

The New Encyclopedia Britannica, vol. 4 Micropedia 15th Edition, pp. 693–695.

The New Encyclopedia Britannica, vol. 15 Macropaedia 15th Edition, p. 785 and 810.

*Primary Examiner*—William A. Cuchlinski, Jr.
*Assistant Examiner*—John L. Beres
*Attorney, Agent, or Firm*—Gary L. Griswold; Walter N. Kirn; Peter L. Olson

[57] ABSTRACT

An indicator is disclosed for providing an indication that a food item has attained a desired temperature. The indicator includes an organic retainer that maintains a plunger in a retracted position until the material from which the retainer is constructed yields. When the retainer yields, a spring urges the plunger toward an extended position to indicate that the food item has attained the desired temperature.

16 Claims, 2 Drawing Sheets

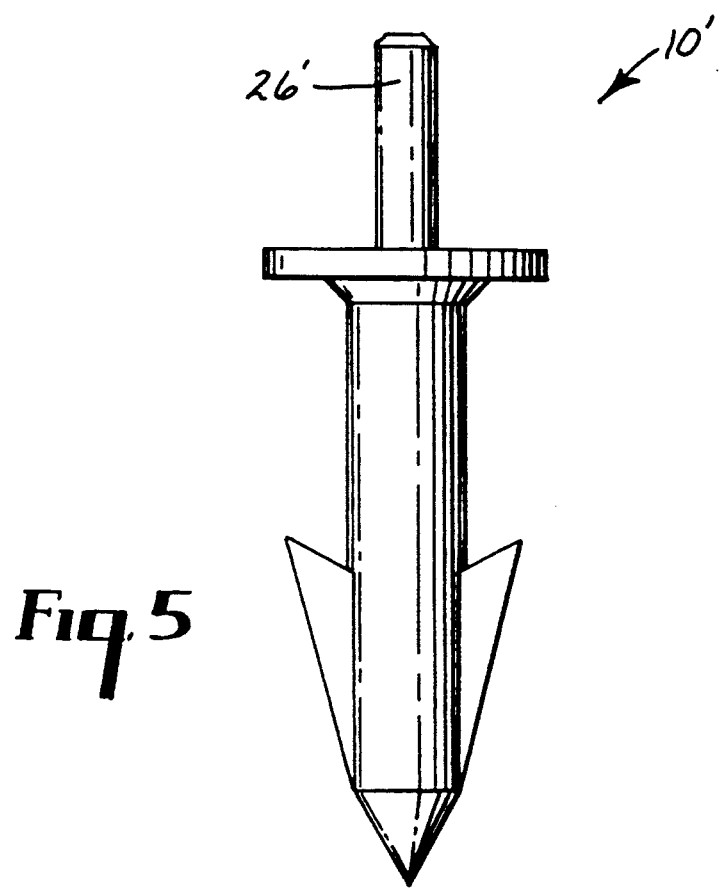

THERMALLY RESPONSIVE INDICATOR WITH ORGANIC RETAINING MEANS

This is a continuation of application Ser. No. 07/747,385, filed Aug. 20, 1991, now abandoned.

TECHNICAL FIELD

This invention relates to thermally responsive indicating devices. More particularly, it relates to devices which provide a signal upon the attainment of desired temperatures.

BACKGROUND OF THE INVENTION

Thermally responsive indicators are useful in a variety of fields for providing a visual indication of the attainment of a desired temperature. For example, U.S. Pat. No. 4,083,364 discloses a thermal indicator mounted through the skull of an animal to detect the presence of an elevated body temperature. German Patent No. 3,229,020 discloses a thermally responsive indicator that is designed to be mounted on an electrical conductor. The device provides a visual indication of the attainment of an elevated temperature in the conductor. U.S. Pat. No. 4,818,119 discloses a railroad wheel bearing bolt with an axially extending bore into which a heat sensor and indicator are inserted. The indicator is exposed when a desired temperature is attained Another example can be found in U.S. Pat. No. 4,289,088, which discloses a sterility indicating device for use in a steam autoclave.

Thermally responsive indicating devices are especially useful in preparing food products, particularly meat and fowl. Such devices are useful for indicating the elevated temperature of the interior of the food product, rather than the temperature of the exterior thereof. By indicating the attainment of a desired internal temperature of the food product, such devices can signal when the food product is organoleptically acceptable. Furthermore, these devices must be sufficiently accurate to prevent undercooking or overcooking, which significantly diminishes the palatability of the food, and may even render the food dangerous to eat, as in the case of undercooked pork.

Several such devices for use in cooking food are known. Examples of early indicating devices are described in U.S. Pat. Nos. 945,978 and 1,509,110, each of which allows a plunger biased by a spring to be released into an extended position upon attaining a predetermined temperature. Retaining means, which is usually a fusible material, holds the plunger in a retracted position until the fusible material yields, at which time a spring urges the plunger into an extended position. When in the extended position, the plunger provides a visual indication to the user that the food is "done." To further enhance the visibility of the plunger when it is in the extended position, a cap may be attached to the end thereof.

The retaining material has typically comprised metal alloys, as in U.S. Pat. Nos. 3,140,611, 3,682,130, 3,693,579 and 3,713,416. The '611 patent, for example, refers to an alloy "consisting of bismuth—52%, lead—40%, cadmium—8%, to which is added two parts of Wood's alloy." Indicators that use such alloys include the "Vue-Temp" brand and "Pop-Rite" brand pop-up timers by the Volk Development Company of Turlock, Calif. 95381. While devices employing such alloy retaining materials have proven useful, they have certain drawbacks. For example, such alloys are typically prepared from toxic metallic substances such as bismuth, lead, cadmium, tin and other materials, as noted above. Furthermore, metal alloys are high density materials. Thus, relatively heavy amounts of alloy must be used in order to provide a given volume of retaining material, thereby adding to the expense of the device.

Organic compounds, such as waxes, have been suggested as replacements for metal alloys but have not proven to be satisfactory. Waxes typically yield over a relatively wide temperature range and if composed of a mixture of different materials, can have multiple melting temperatures, thereby resulting in an early or a delayed signal. This, as mentioned above, is undesirable because the food item could either be undercooked or overcooked, respectively.

A known device which attempts to overcome the problems exhibited by alloy and wax retaining materials is described in U.S. Pat. No. 4,170,956. The '956 patent discloses a nitrogen-containing organic retaining material. Devices using these nitrogen-containing materials have been sold in the United States under the name "Dun-Rite" brand pop-up timers by Minnesota Mining and Manufacturing Company of St. Paul, Minn. The nitrogen-based materials used in these devices do not exhibit the toxicity problems of their alloy predecessors and exhibit better release characteristics than waxes. However, while having their own utility, the nitrogen-based materials disclosed in the '956 patent also have certain drawbacks.

For example, the nitrogen-based materials of the '956 patent are very pure when they are prepared. Melting temperature (and therefore yield temperature) tends to increase with increased purity, and the materials of the '956 patent melt at approximately 84.9° C. when they are tested in their purest state. A turkey, for example, is considered "done" when the interior temperature reaches approximately 82.2° C., and the retaining material must therefore be mixed with a foreign substance to reduce its purity. The foreign substances are often an excess amount of one of the constituent elements of the nitrogen-based material, which adds unnecessary expense. Salts, which are added to the material to clean it, tend to solidify to form gel globules in the material which necessitates that the material be strained in order to obtain functionally acceptable material. The straining process often must be conducted repeatedly, which increases the time and cost of production. The available yield is reduced, and consequently, a greater amount of material must be manufactured and processed to obtain a given amount of retaining material.

SUMMARY OF THE INVENTION

A thermal indicator is disclosed for providing an indication that an article of food is heated to a desired temperature. The indicator comprises a barrel having an opening communicating with a chamber within the barrel, a plunger disposed in the chamber and adapted for sliding travel therein between a retracted position and an extended position, means for resiliently biasing the plunger away from the retracted position and toward the extended position, and retaining means for releasably retaining the plunger in the retracted position. The barrel is adapted for insertion into the article of food to be heated.

The retaining means comprises a retaining material comprising at least one saturated organic compound, straight-chain or cyclic, having a sufficient number of carbon atoms in the straight-chain or ring such that the compound will be a solid at a temperature at or below 55° C., the atoms of the straight-chain or ring consisting only of carbon atoms uninterrupted by atoms other than carbon atoms. Either or both ends of the straight-chain can have carboxyl groups, hydroxyl groups, ester groups, or amine groups attached thereto. If the compound is cyclic, it is preferably a cyclic alcohol.

The organic compounds are preferably at least 80% pure, more preferably at least 95% pure, by weight. These organic compounds preferably consist of single crystals and therefore have a single melting temperature. It is also preferred that the melting temperature of the material be from 56° C. to 95° C. and melt within 15° C. of the melting temperature. The aforementioned organic materials are inexpensive and result in a substantial cost savings per unit. More importantly, the retaining materials are not toxic and are therefore safer for use in food than are metal alloy retaining materials.

BRIEF DESCRIPTION OF THE DRAWINGS

FIG. 5 is a side elevation view of an alternate embodiment of the indicator of the present invention.

DETAILED DESCRIPTION OF THE INVENTION

Figure 1:
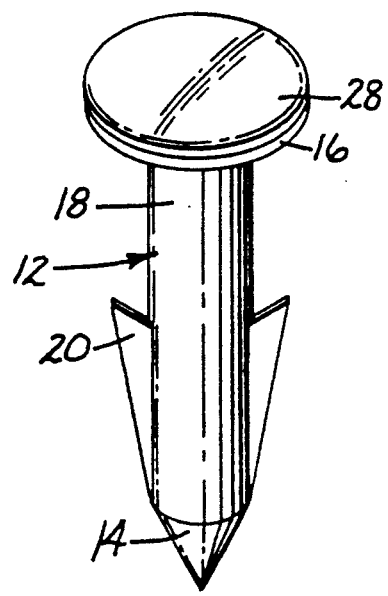
FIG. 1 is an inclined side elevation view of the indicator of the present invention.
Figure 2:
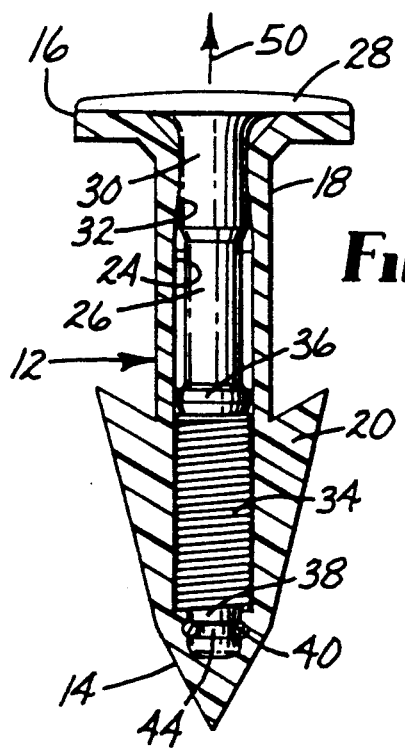
FIG. 2 is a central longitudinal sectional view of the indicator of FIG. 1 in a retracted position, viewed in the plane 2—2 of FIG. 1.

Referring specifically to FIGS. 1 and 2, indicator 10 is shown including barrel 12. Barrel 12 is a monolithic molded body made of a material capable of withstanding the elevated temperatures encountered in a cooking environment. Nylon is the preferred material, although other materials could be adapted for use in the cooking environment as well. Barrel 12 includes lower barrel end 14 adapted for insertion into a food item and may be provided with one or more barbs 20 radially disposed near lower barrel end 14 for retaining the indicator in the food once inserted. Barrel 12 also includes annular flange 16 located adjacent upper barrel end 18. Flange 16 may be of varying radial dimensions so as to contact the surface of the food item when indicator 10 is inserted therein to prevent further insertion.

Figure 3:
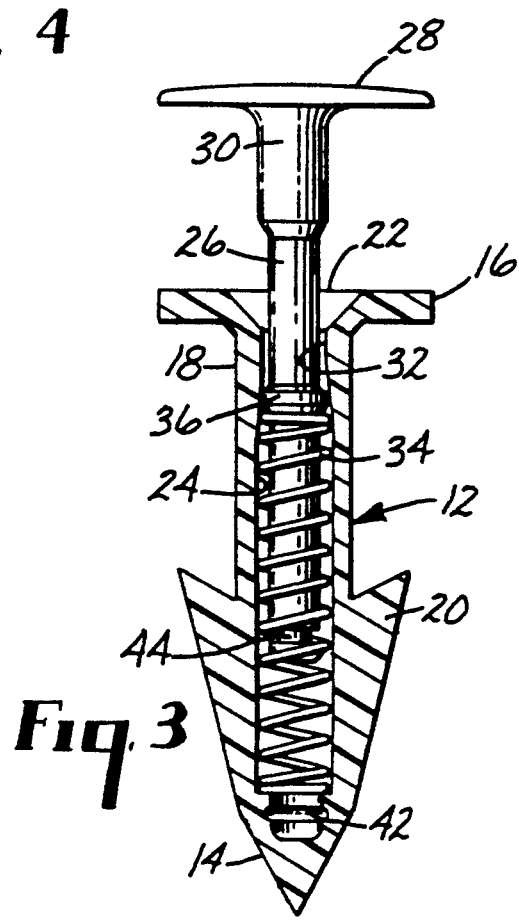
FIG. 3 is a central longitudinal sectional view of the indicator of FIG. 1 in an extended position.

Barrel 12 communicates through orifice 22 with cavity 24. Cavity 24 is adapted to contain at least part of plunger 26 that is disposed through orifice 22 of barrel 12 and is maintained in slidable relation thereto within cavity 24. Plunger 26 is adapted to travel between a retracted position and an extended position. FIGS. 1 and 2 illustrate plunger 26 in a retracted position, but the term "retracted position" is not limited to one in which cap 28 is in intimate contact with flange 16. Additionally, the indicator of the present invention, when constructed without the cap of the preferred embodiment, may be in a retracted position with upper plunger end 30 either within cavity 24 or partially protruding therefrom. FIG. 3 illustrates plunger 26 in an extended position. Plunger 26 provides a visual indication of the attainment of a predetermined temperature when plunger 26 is in an extended position.

Means are provided to resiliently bias plunger 26 toward the extended position. In the illustrated embodiment, the biasing means comprises a spring 34. In FIG. 2, spring 34 is circumferentially disposed about plunger 26 and exerts a force in direction 50 against annular plunger flange 36 located on plunger 26. The opposite end of spring 34 contacts and exerts a force against annular seat 38, formed in cavity 24.

Retaining means are provided to maintain plunger 26 in a retracted position prior to use against the force of spring 34. The retaining means includes a quantity of a retaining material 40 positioned within cavity 24 to mechanically interfere with plunger 26. In the illustrated embodiment, retaining material 40 is positioned within annular retainer cavity 42, which is aligned with annular plunger depression 44. Both retainer cavity 42 and plunger depression 44 are illustrated as annular semi-hemispherical depressions, but any configuration which will permit mechanical interference between retaining material 40 and retainer cavity 42, and/or between retaining material 40 and plunger depression 44 is contemplated. Furthermore, retaining material 40, plunger depression 44 and retainer cavity 42 could be located at any point along plunger 26 so as to retain plunger 26, but are preferably located adjacent lower barrel end 14.

Plunger 26 is maintained in a retracted position by the retaining material 40 until, after exposure to an elevated temperature at or near the desired temperature, retaining material 40 yields, allowing spring 34 to move plunger 26 in direction 50. The "melting temperature," as used herein, indicates the onset temperature or the temperature at which the retaining material begins to melt. The temperature at which all the material has melted is immaterial to the present invention, because yielding will occur before all the material has melted. "Yield" shall be understood to comprise fuse, melt, plasticize, or to become ductile, malleable, or deformable to the point where the retaining material is of insufficient shear strength to maintain the plunger in a retracted position against the pressure of spring 34. "Yield temperature" is the temperature at which yielding occurs, and is typically near the melting temperature, although the exact yield temperature differs depending on the material and purity level selected.

Yielding may occur by one of several mechanisms. Once the ambient temperature reaches the melting temperature of retaining material 40, part of the material may liquefy, and thereafter function as a lubricant. Alternatively, retaining material 40 may liquefy quickly and be of insufficient shear strength to maintain shaft 36 in the retracted position. Retaining material 40 may also soften until spring 34 causes part of the material to be sheared away by retainer cavity 42. Once the shear strength of retaining material 40 has diminished, spring 34 urges shaft 36 into an extended position, which provides a visual indication of the attainment of the desired temperature. Referring to FIG. 3, plunger 26 is shown in the extended position, which position corresponds to the ambient temperature being above the yield temperature of retaining material 40.

Figure 4:
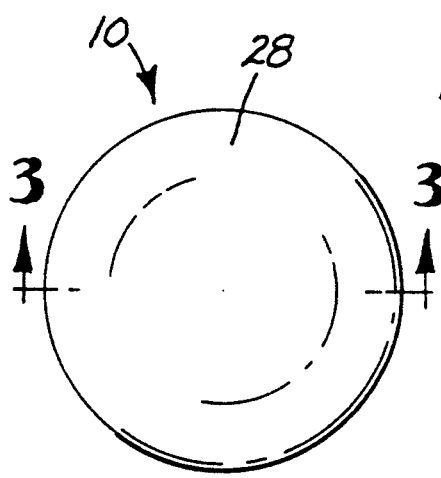
FIG. 4 is a top view of the indicator of FIG. 1.

Referring to FIGS. 1 and 4, the preferred embodiment of the present invention is shown. Cap 28 is affixed atop plunger 26 and is adapted to maintain intimate contact with flange 16. When plunger 26 is in a retracted position, cap 28 prevents contaminants from entering cavity 24, and prevents retaining material from leaking out of indicator 10. Cap 28 also provides increased visibility when plunger 26 is in the extended position. Upper plunger end 30 can be adapted to maintain sliding sealing contact with cavity wall 32 to further aid in preventing contaminants from entering, or retaining material from leaving cavity 24.

Referring to FIG. 5, an alternate embodiment 10' of the present invention is shown. Cap 28 has been omitted, thereby presenting plunger 26' for visual identification upon the attainment of the desired temperature.

The present invention is specifically directed to improvements in retaining material 40. The compounds suitable for preparing the retaining material of this invention include saturated organic materials which are either straight-chain or cyclic compounds. The compounds should have a sufficient number of carbon atoms in the straight-chain or ring such that they will be solids at temperatures equal to or less than 55° C. The atoms in the straight-chain or ring consist only of carbon atoms uninterrupted by atoms other than carbon atoms. The chains or rings can neither be unsaturated nor branched. The organic compounds can be selected from. hydrocarbons, fatty acids, fatty alcohols, fatty esters, fatty amines, and fatty ketones. The fatty acids, fatty alcohols, and fatty amines can be either monofunctional or difunctional. These compounds include straight-chain hydrocarbons having at least 26 uninterrupted carbon atoms in the straight-chain, preferably from 28 to 50 uninterrupted carbon atoms in the straight-chain; monofunctional, straight-chain fatty acids having at least 14 uninterrupted carbon atoms in the straight-chain, preferably from 16 to 30 uninterrupted carbon atoms in the straight-chain; monofunctional, straight-chain fatty alcohols having at least 18 uninterrupted carbon atoms in the straight-chain, preferably from 19 to 35 uninterrupted carbon atoms in the straight-chain; monofunctional, straight-chain fatty esters having at least 22 uninterrupted carbon atoms in the straight-chain; monofunctional, straight-chain fatty ketones having at least 16 uninterrupted carbon atoms in the straight-chain; monofunctional, straight-chain fatty amines having at least 18 uninterrupted carbon atoms in the straight-chain; difunctional, straight-chain fatty acids having at least 8 uninterrupted carbon atoms in the straight chain; difunctional, straight-chain fatty alcohols having at least 8 uninterrupted carbon atoms in the straight-chain; difunctional, straight-chain fatty amines having at least 8 uninterrupted carbon atoms in the straight-chain, and blends of the foregoing. In the fatty esters, it is preferred that the ester functional group (i.e. $OC_mH_{2m+1}$) contain from 1 to 2 carbon atoms. If straight-chain compounds containing functional groups are used, the functional groups (e.g. —COOH, —OCH$_3$, —OH, —NH$_2$) must be located at the end of the straight-chain.

It is preferred that any organic compound, or blend of compounds, used to prepare the retaining material be at least 80% pure, more preferably at least 95% pure. It is also preferred that any organic compound or blend of compounds used to prepare the retaining material be a single crystal organic compound, and that the compound have a single melting temperature, preferably between 56° C. and 95° C. The compound should be adapted to melt within 15° C. of the melting temperature. Melting temperatures of the compounds disclosed herein were determined by using a differential scanning calorimeter (DSC) which was programmed to increase the ambient temperature at the rate of 10C° per minute. The DSC used was the DuPont 912 Differential Scanning Calorimeter, manufactured by the E. I. DuPont de NeMours & Company, Inc., Wilmington, Del. 19898.

The following table lists:

(a) the general formula of each class of compound suitable for this invention;
(b) the specific formula of at least one compound in each of the foregoing classes; and
(c) the melting temperature of the specific compound shown ($T_m$).

| Class of Compound and Formula | Specific Compound of Class and Formula | $T_m$ (°C.) |
|---|---|---|
| I. Hydrocarbon $C_nH_{2n+2}$ $n \geq 26$ | $CH_3(CH_2)_{24}CH_3$ | 57 |
| | $CH_3(CH_2)_{27}CH_3$ | 64 |
| | $CH_3(CH_2)_{38}CH_3$ | 80 |
| | $CH_3(CH_2)_{48}CH_3$ | 94 |
| II. Fatty Acid | | |
| Monofunctional $C_nH_{2n+1}COOH$ $n \geq 14$ | $CH_3(CH_2)_{14}COOH$ | 62 |
| | $CH_3(CH_2)_{18}COOH$ | 76 |
| | $CH_3(CH_2)_{22}COOH$ | 84 |
| | $CH_3(CH_2)_{28}COOH$ | 93 |
| Difunctional $HOOCC_pH_{2p}COOH$ $p \geq 8$ | $HOOC(CH_2)_{20}COOH$ | 81 |
| III. Fatty Alcohol | | |
| Monofunctional $C_nH_{2n+1}OH$ $n \geq 18$ | $CH_3(CH_2)_{17}OH$ | 59 |
| | $CH_3(CH_2)_{23}OH$ | 74 |
| | $CH_3(CH_2)_{27}OH$ | 83 |
| Difunctional $HOC_pH_{2p}OH$ $p \geq 8$ | $HO(CH_2)_8OH$ | 60 |
| IV. Fatty Ester $C_nH_{2n+1}COOC_mH_{2m+1}$ $n \geq 22$ $m \geq 1$ | $CH_3(CH_2)_{22}COOCH_3$ | 60 |
| | $CH_3(CH_2)_{22}COOC_2H_5$ | 56 |
| V. Fatty Ketone $C_nH_{2n+1}COC_mH_{2m+1}$ $n \geq 8$ $m \geq 8$ | $CH_3(CH_2)_9CO(CH_2)_9CH_3$ | 64 |
| VI. Fatty Amine | | |
| Monofunctional $H_2NC_nH_{2n+1}$ $n \geq 18$ | $CH_3(CH_2)_{17}NH_2$ | 60 |
| Difunctional $H_2NC_pH_{2p}NH_2$ $p \geq 8$ | $H_2N(CH_2)_{12}NH_2$ | 64 |
| VII. Cyclic Fatty Alcohol $C_nH_{2n-1}OH$ $n \geq 8$ | $C_{12}H_{23}OH$ | 74 |

It is preferred that the carbon atoms in the straight-chain, in the ring, in the ester groups, and in the acid groups not have substituents other than hydrogen atoms. However, these carbon atoms can have substituents other than hydrogen atoms, provided that these substituents are chemically and physically inert upon being subjected to the heat which is applied during use of the indicator in a cooking environment.

The organic materials required to produce the retaining material of the present invention can be ordered in the desired purity from suppliers according to the following list.

| | |
|---|---|
| Tokyo Kasei Kogyo Co., Ltd. | |
| Tokyo Chemical Industry Co., Ltd. | |
| 3-9-4 Nihonbashi-Honcho, Chuo-Ku | |
| Tokyo 103 | |
| JAPAN | |
| $CH_3(CH_2)_{24}CH_3$ | $CH_3(CH_2)_{17}OH$ |
| $CH_3(CH_2)_{27}CH_3$ | $CH_3(CH_2)_{23}OH$ |
| $CH_3(CH_2)_{38}CH_3$ | $CH_3(CH_2)_{27}OH$ |
| $CH_3(CH_2)_{48}CH_3$ | $CH_3(CH_2)_{22}COOCH_3$ |
| $CH_3(CH_2)_{14}COOH$ | $CH_3(CH_2)_{22}COOC_2H_5$ |
| $CH_3(CH_2)_{18}COOH$ | $CH_3(CH_2)_9CO(CH_2)_9CH_3$ |
| $CH_3(CH_2)_{22}COOH$ | $CH_3(CH_2)_{14}CO(CH_2)_{14}CH_3$ |
| $CH_3(CH_2)_{28}COOH$ | $CH_3(CH_2)_{17}NH_2$ |
| Pfaltz & Bauer, Inc. | |
| Division of Aceto Corporation | |

172 E Aurora Street
Waterbury, CT 06708

$HOOC(CH_2)_{20}COOH$
$HO(CH_2)_8OH$
$H_2N(CH_2)_{12}NH_2$
$C_{12}H_{23}OH$

The indicator of the present invention is prepared and assembled in the following manner. The organic material is heated and melted in a glass or stainless steel container to a temperature not to exceed 250° C. The resultant molten material is poured through a screen into another heated vessel (also less than 250° C.) to strain out any foreign matter. In contrast to the nitrogen-containing material of the '956 patent, the retaining material of the present invention does not gel, and must be screened only to remove any foreign particles that have infiltrated the mixture. A metered amount of the material is pumped into barrel 12. In the preferred embodiment, spring 34 is guided into the barrel, and plunger 26 is then guided through the spring and into the barrel.

The entire barrel is heated to between 130° C. and 260° C. while the plunger is slowly depressed into a retracted position. The temperature to which the barrel must be heated to melt the material within depends on several factors, including the type of material used to construct the barrel, the wall thickness, and the type of retaining material used. Once the plunger has been pressed into a retracted position and the organic material melted, the plunger is held in place by means known in the art, and therefore not shown, while indicator 10 is cooled by a water source, thereby solidifying retaining material 40.

The retaining materials of the present invention are non-toxic, readily available from commercial resources, and less expensive than alloys and the nitrogen-containing materials of the '956 patent. In addition, the assembly process of the present invention is significantly faster and more efficient than that required for the nitrogen-containing materials of the '956 patent, because the retaining materials of the present invention do not gel, and therefore require straining only to remove foreign particulate matter.

The present invention has now been described with reference to several embodiments thereof. It will be apparent to those skilled in the art that many changes can be made from the embodiments described without departing from the scope of the present invention. For example, the present invention has been described with reference to heating food in a conventional oven, but the present invention could be used in a microwave oven with suitable modifications. Thus, the scope of the present invention should not be limited to the structures described in this application, but only by structures described by the language of the claims, and the equivalents of those structures.

What is claimed is:

1. A thermal indicator for providing an indication that an article of food is heated to a desired temperature, comprising:

a barrel having an orifice communicating with a cavity within said barrel, said barrel being adapted for insertion into the article of food to be heated;
a plunger disposed in said cavity and adapted for sliding travel therein between a retracted position and an extended position;
means for resiliently biasing said plunger away from said retracted position and toward said extended position; and
means for releasably retaining said plunger in said retracted position, said means comprising an organic substance which, when below the desired temperature, maintains said plunger in said retracted position, and which, when at or above the desired temperature, yields to permit release of said plunger, said organic retaining means comprising at least one saturated organic compound, straight-chain or cyclic, having a sufficient number of atoms in the straight-chain or ring such that said at least one compound will be a solid at a temperature equal to or less than 55° C. the atoms of said straight-chain or ring consisting only of carbon atoms uninterrupted by atoms other than carbon atoms, said at least one compound containing at least one functional group, said plunger released from said retracted position upon the attainment of the desired temperature, said biasing means urging said plunger into said extended position for visual indication.

2. The indicator of claim 1, wherein said at least one compound is a straight-chain compound having a functional group selected from the group consisting of carboxyl groups, hydroxyl groups, ester groups, and amine groups.

3. The indicator of claim 1, wherein said at least one compound is at least 95% pure by weight.

4. The indicator of claim 1, wherein said melting temperature of said organic retaining means is between 56° C. and 95° C.

5. The indicator of claim 1, wherein said at least one compound is selected from the group consisting of fatty acids, fatty alcohols, fatty esters, fatty ketones, and fatty amines, and mixtures of the foregoing.

6. The indicator of claim 1, wherein said at least one compound is a monofunctional, straight-chain fatty acid having at least 14 carbon atoms in the chain consisting only of carbon atoms uninterrupted by atoms other than carbon atoms.

7. The indicator of claim 1, wherein said at least one compound is a monofunctional, straight-chain fatty alcohol having at least 18 carbon atoms in the chain consisting only of carbon atoms uninterrupted by atoms other than carbon atoms.

8. The indicator of claim 1, wherein said at least one compound is a monofunctional, straight-chain fatty ester having at least 22 carbon atoms in the chain consisting only of carbon atoms uninterrupted other than carbon atoms, wherein the ester group or groups thereof have from 1 to 2 carbon atoms.

9. The indicator of claim 1, wherein said at least one compound is a monofunctional, straight-chain fatty amine having at least 18 carbon atoms in the chain consisting only of carbon atoms uninterrupted by atoms other than carbon atoms.

10. The indicator of claim 1, wherein said at least one compound is a straight-chain fatty ketone having at least 17 carbon atoms in the chain consisting only of carbon atoms uninterrupted by atoms other than carbon atoms.

11. The indicator of claim 1, wherein said at least one compound is a difunctional, straight-chain fatty acid having at least 8 carbon atoms in the chain consisting only of carbon atoms uninterrupted by atoms other than carbon atoms.

12. The indicator of claim 1, wherein said at least one compound is a difunctional, straight-chain fatty alcohol having at least 8 carbon atoms in the chain consisting only of carbon atoms uninterrupted by atoms other than carbon atoms.

13. The indicator of claim 1, wherein said at least one compound is a difunctional, straight-chain fatty amine having at least 8 carbon atoms in the chain consisting only of carbon atoms uninterrupted by atoms other than carbon atoms.

14. The indicator of claim 1, wherein said at least one compound is a cyclic fatty alcohol having at least 8 carbon atoms in the ring consisting only of carbon atoms uninterrupted by atoms other than carbon atoms.

15. The indicator of claim 1, wherein said at least one compound is a cyclic fatty acid having at least 8 carbon atoms in the ring consisting only of carbon atoms uninterrupted by atoms other than carbon atoms.

16. The indicator of claim 1, wherein said plunger comprises a cap mounted atop said plunger.

* * * * *